US008702113B2

(12) United States Patent
Trotter et al.

(10) Patent No.: US 8,702,113 B2
(45) Date of Patent: Apr. 22, 2014

(54) DIRECT ACTING END LINK

(75) Inventors: Jason K Trotter, Des Plaines, IL (US); Dennis M Mark, Buffalo Grove, IL (US); Troy S Field, South Lyon, MI (US)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 13/581,521

(22) PCT Filed: Mar. 22, 2011

(86) PCT No.: PCT/US2011/029307
§ 371 (c)(1),
(2), (4) Date: Aug. 28, 2012

(87) PCT Pub. No.: WO2011/119526
PCT Pub. Date: Sep. 29, 2011

(65) Prior Publication Data
US 2012/0321375 A1 Dec. 20, 2012

Related U.S. Application Data

(60) Provisional application No. 61/317,314, filed on Mar. 25, 2010.

(51) Int. Cl.
*F16C 11/04* (2006.01)
(52) U.S. Cl.
USPC .............. 280/124.107; 403/119; 280/124.152

(58) Field of Classification Search
USPC ................... 280/124.107, 124.152; 267/188; 403/119, 150
See application file for complete search history.

(56) References Cited

U.S. PATENT DOCUMENTS

| | | | | |
|---|---|---|---|---|
| 2,169,969 A * | 8/1939 | Allison | | 267/189 |
| 4,575,114 A * | 3/1986 | Camp | | 280/124.152 |
| 4,883,287 A | 11/1989 | Murakami et al. | | |
| 4,944,523 A * | 7/1990 | Hardy et al. | | 280/124.152 |
| 5,449,193 A * | 9/1995 | Rivard et al. | | 280/124.152 |
| 5,551,722 A * | 9/1996 | Schwartz et al. | | 280/124.152 |
| 5,807,010 A * | 9/1998 | Parker et al. | | 403/61 |
| 6,572,127 B2 * | 6/2003 | Pazdirek | | 280/124.152 |
| 7,258,504 B2 * | 8/2007 | Griffin | | 403/150 |
| 8,109,848 B2 * | 2/2012 | Bohm et al. | | 474/82 |
| 2003/0209870 A1 * | 11/2003 | Carlstedt et al. | | 280/124.107 |
| 2008/0054583 A1 * | 3/2008 | Pazdirek et al. | | 280/124.152 |
| 2008/0187395 A1 | 8/2008 | Goerg | | |
| 2012/0321375 A1 * | 12/2012 | Trotter et al. | | 403/119 |

FOREIGN PATENT DOCUMENTS

| | | | |
|---|---|---|---|
| EP | 0312997 A1 | 4/1989 | |
| EP | 0385355 A1 | 9/1990 | |
| JP | 6-39204 B2 | 5/1994 | |

* cited by examiner

*Primary Examiner* — Karen Beck
(74) *Attorney, Agent, or Firm* — Mark W. Croll; Paul F. Donovan

(57) ABSTRACT

An end link suitable for connecting a direct acting stabilizer bar to a steerable strut includes a rod having first and second grommets thereon. Bearing assemblies are provided adjacent the grommets and include portions thereof connected to for rotation with the grommets and other portions thereof independently rotatable relative to the grommets.

18 Claims, 9 Drawing Sheets

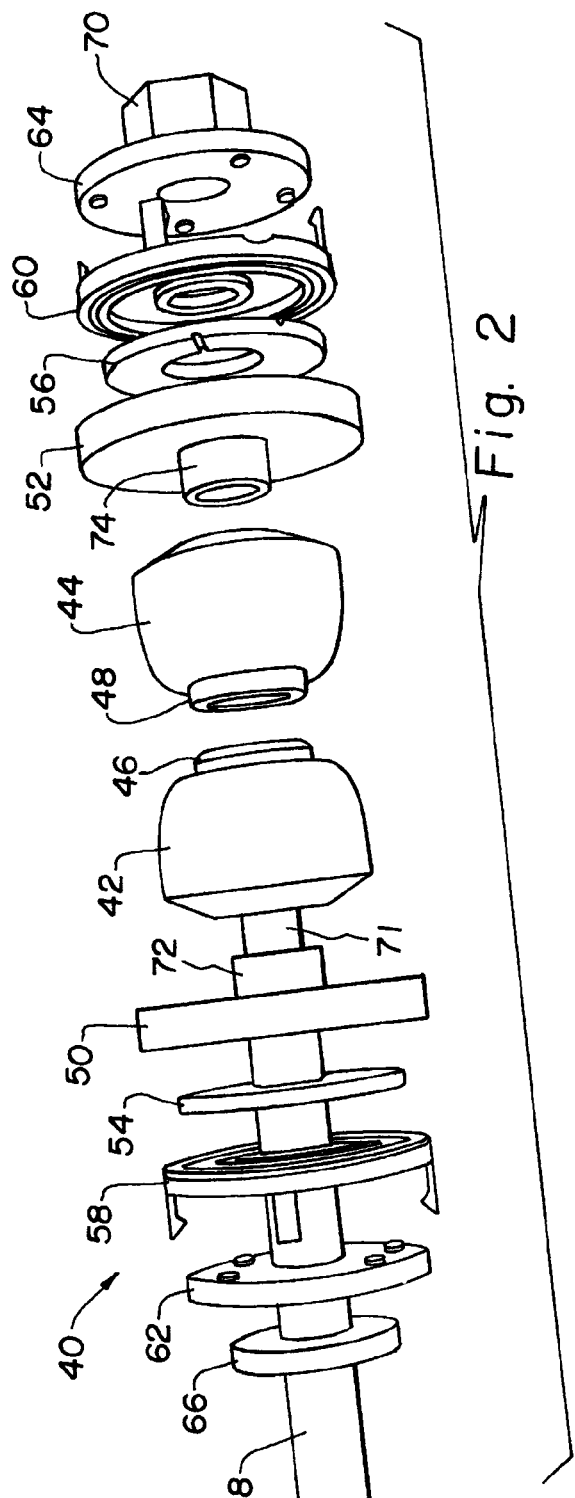
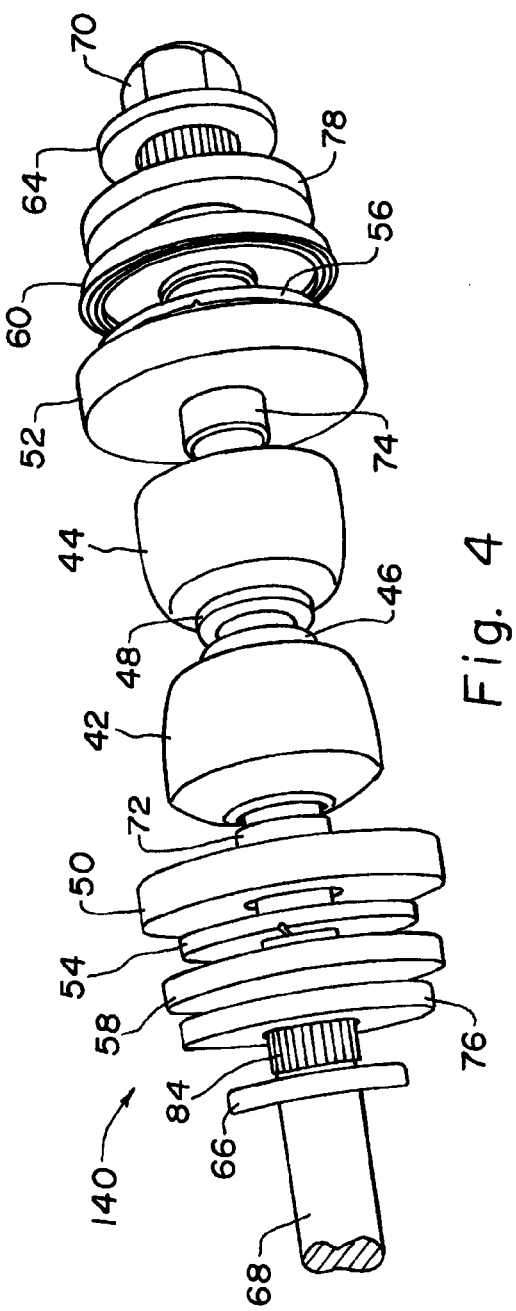
Fig. 2
Fig. 4

DIRECT ACTING END LINK

CROSS-REFERENCE TO RELATED APPLICATIONS

The present application is based on International Application No. PCT/US2011/029307, filed Mar. 22, 2011 and claims the benefits of U.S. Provisional Application Ser. No. 61/317,314 filed Mar. 25, 2010.

FIELD OF THE INVENTION

The present invention relates generally to suspension systems in automobiles, and, more particularly to end links associated with stabilizer bars, control arms and struts in automobile suspension systems, particularly steerable strut type suspension systems.

BACKGROUND OF THE INVENTION

It is known to provide automobile suspension systems with a variety of different suspension system configurations for controlling handling, comfort and performance. For example, it is known to provide vertical struts to counteract vertical deflection from bumps, body roll and the like. In some configurations the strut is attached within the overall steering system whereby the strut also rotates as the vehicle is steered. Such configurations are known as "steerable strut suspensions".

Stabilizer bars are known in many configurations for vehicle suspension systems and may be connected to the suspension system in various ways. When connected to the strut to directly act against the strut the system is commonly referred to as a "direct acting" suspension system in that the stabilizer bar acts directly on the strut. When a direct acting stabilizer is provided on a steerable strut, the connection is somewhat complicated in that the link used to connect the stabilizer bar to the strut must withstand and accommodate not only vertical movement of the strut, but also rotational movement of the strut when the vehicle is steered right or left, in addition to the twisting moment provided on the stabilizer bar during operation. The link may experience significantly different articulation at opposite ends thereof, with the strut end connection experiencing primarily rotation, and the stabilizer end connection experiencing primarily angulation. Ball joint links have been used in such configurations to accommodate the multidirectional articulations and forces acting on the connections.

A ball joint link includes a rotatable ball held in an attachment which accommodates rotational movement of the connecting end, normally at right angles to the link stud itself. Ball joint links require lubrication which is held in place by ball joint boots. The boot, which is required for sealing, retains grease in the ball joint structure. However, boots are sometimes easily worn, cut or cracked, and can allow the ingress of contaminants and thereafter trap the contaminants when present in the joint. Ball joint link boots have proven to be components of frequent and regular service or repair. Further, due to the rotational nature of the end of a ball joint link, assembly and installation have been difficult in that the fastened end must be driven into place, and rotation of the end makes it difficult to hold in proper position. Further, ball joint links have been susceptible to corrosion due to wear, and when worn or corroded tend to fail or operate poorly, resulting in noise or other problems.

Conventional grommet end links are also known for use in linear attachments, such as between a stabilizer bar and a control arm. Such end links can be simple in nature, with linear threaded components at each end. However, simple linear end links can not be used in many installations of direct acting suspensions on steerable struts due to the rotational movement at the connecting joint.

Accordingly, it would be advantageous to provide a grommet end link suitable for direct acting suspensions systems having steerable struts.

SUMMARY OF THE INVENTION

The direct acting end links disclosed herein include grommets to be positioned on opposite sides of a strut mounting pad and a rod extending through the grommets and mounting pad. At an inner end, the rod includes a collar and holds a washer or bearing against one of the grommets and at the outer end the rod holds a washer against the other grommet and has an end nut attached thereto. By locating and interconnecting various groups of these structures, the locations of relative rotation between parts can be predetermined for better control in minimizing wear and noise. By compressing the grommets into and against the strut mounting pad, the grommets can expand and compensate for dimensional changes as wear occurs.

In one aspect of one form thereof, an end link for connecting a stabilizer to a strut in a direct acting suspension system is provided with first and second grommets confronting each other and configured for engaging a strut mounting pad therebetween, and first and second bearing assemblies adjacent the first and second grommets respectively on opposite sides of the grommets. A rod extends through the first and second grommets and the first and second bearing assemblies. First and second end structures of the rod confront opposite sides of the first and second bearing assemblies for compressing the first and second grommets toward one another.

In another aspect of a form thereof, an end link for connecting a stabilizer bar to a steerable strut having a mounting pad is provided with a rod including a fixed collar and a threaded end and first and second grommets confronting each other on the rod and configured for sandwiching the mounting pad therebetween. A first bearing assembly is provided on the rod between the fixed collar and one of the grommets, and a second bearing assembly is provided on the rod between the threaded end and the other of the grommets. A nut is engaged on the threaded end of the rod.

In a further aspect of a form thereof, a strut connecting end on an end link including a rod is provided for connecting the rod to a mounting pad. The strut connecting end has a threaded end on the rod, a nut engaging the threaded end, and a collar on the rod spaced inwardly from the threaded end. First and second grommets and first and second bearing assemblies are on the rod between the nut and the collar. A mounting pad receiving space is defined between either the first and second grommets or the first and second bearing assemblies. Portions of the first and second bearing assemblies are interconnected with the rod for limited relative rotation there between, and other portions of the first and second bearing assemblies are interconnected with a mounting pad held in the mounting pad receiving space.

Other features and advantages of the invention will become apparent to those skilled in the art upon review of the following detailed description, claims and drawings in which like numerals are used to designate like features.

BRIEF DESCRIPTION OF THE DRAWINGS

FIG. 2 is an exploded view of the end link shown in FIG. 1;

FIG. 4 is an exploded view of the end link shown in FIG. 3;

Figure 1:
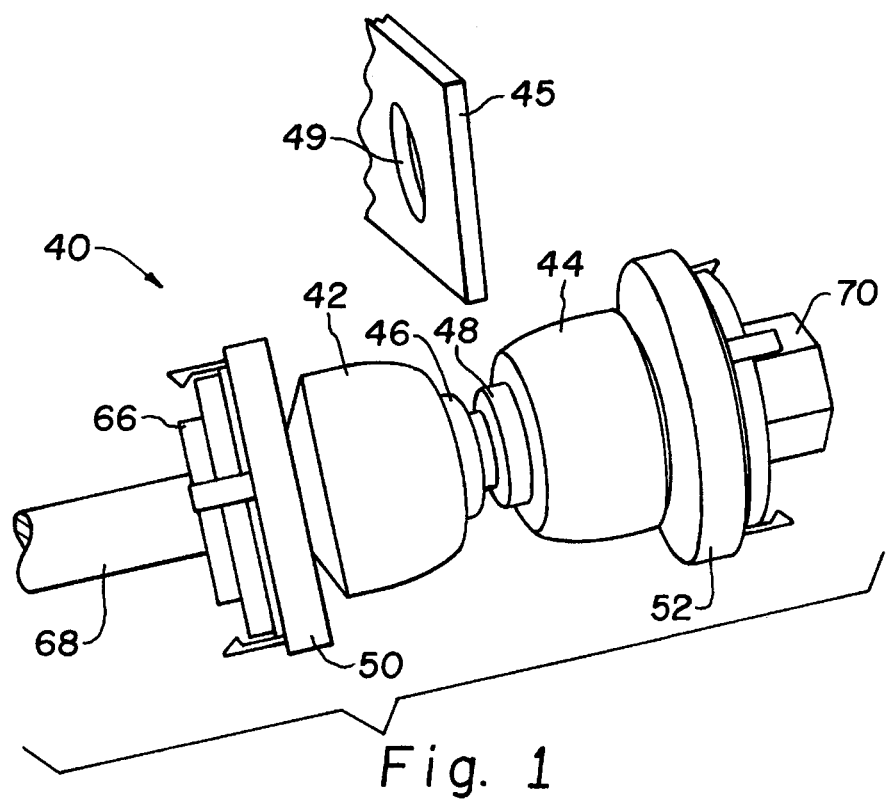
FIG. 1 is a perspective view of a direct acting end link.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings and to FIGS. 1 and 2 in particular, a direct acting end link 40 is shown. End link 40 includes a strut connecting end having first and second grommets 42, 44 that are to be positioned and installed on opposite sides of a mounting pad 45 or other point of attachment to a strut. Grommets 42, 44 include confronting, projecting collars 46, 48 of reduced a diameter that are received in and engage opposite sides of a through hole 49 in mounting pad 45. Bearing assemblies are provided adjacent each grommet and include bearing races 50, 52 bearings 54, 56 bearing races 58, 60 and washers 62, 64. Washer 62 confronts a fixed collar 66 on a link rod 68. On a distal end of link rod 68, a nut 70 secures the assembly by engagement with threads 71 of rod 68. Washer 64 and nut 70 can be provided as a unitary assembly. Bearing races 50, 52 include race collars 72, 74 that are received in and engage grommets 42, 44. Rod 68 extends through grommets 42, 44 loosely so that the grommets can move relative to the rod.

In use of the exemplary embodiment shown in FIGS. 1 & 2, grommets 42, 44 are installed in mounting pad 45, with grommet collars 46, 48 inserted into opposite sides of hole 49. Race collars 72, 74 are inserted into grommets 42, 44 respectively. As end nut 70 is tightened on threads 71, the assembly is compressed together, such that grommet collars 46, 48 and grommets 42, 44 are compressed into and against mounting pad 45, and bearing race collars 72, 74 and bearing races 50, 52 are held in and against grommets 42, 44. Accordingly, grommets 42, 44; mounting pad 45 and bearing races 50, 52 are generally held together against relative rotation with respect to one another and rotate or otherwise move as a first subassembly together with a strut to which end link 40 is connected through mounting pad 45. Bearing races 58, 60; washers 62, 64; collar 66; rod 68 and nut 70 are connected one to another as a somewhat separate second subassembly such that bearing races 58, 60; washers 62, 64; collar 66, rod 68 and a nut 70 are held against rotation relative to one another and generally move together independently of the aforementioned first subassembly of grommets 42, 44; bearing races 50, 52 and mounting pad 45. Bearings 54, 56 operate independently between the two aforementioned subassemblies, allowing relative movement between the first and second subassemblies.

Figure 3:
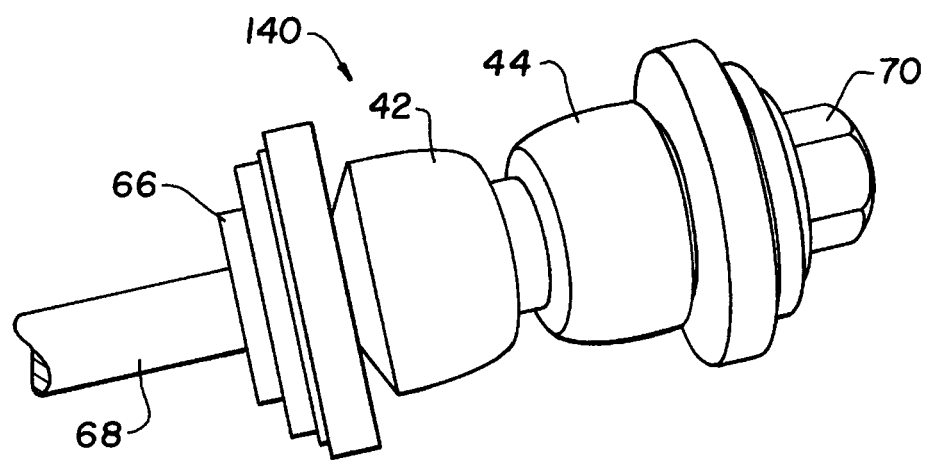
FIG. 3 is a perspective view of another direct acting end link.

FIGS. 3 and 4 illustrate assembled and exploded views of a variation for an end link 140 similar to end link 40. Accordingly, component parts of end link 140 that are the same as component parts of end link 40 have been identified with the same reference numbers in both end link 40 and end link 140. Washers 76, 78 are left to rotate freely as knurls on rod 68 and/or nut 70 directly tie bearing races 58, 60 together as one subassembly. End link 140 is assembled and installed similarly to end link 40 such that grommets 42, 44 are compressed into and against a strut mounting pad, and bearing races 50, 52 are compressed into and against grommets 42, 44. Grommets 42, 44; bearing races 50, 52 and a mounting pad held between grommets 42, 44 are compressively connected together in a first subassembly as described previously herein such that relative rotation between grommets 42, 44; bearing races 50, 52 and the mounting pad is restricted.

Figure 5:
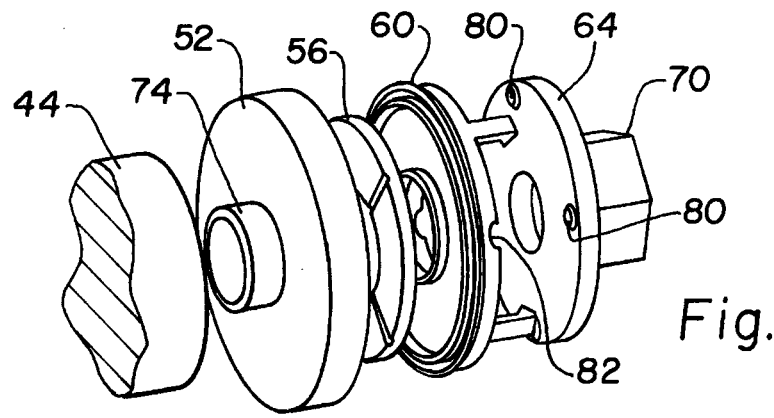
FIG. 5 is a fragmentary exploded view of a variation of the end link shown in FIGS. 1 & 2.
Figure 6:
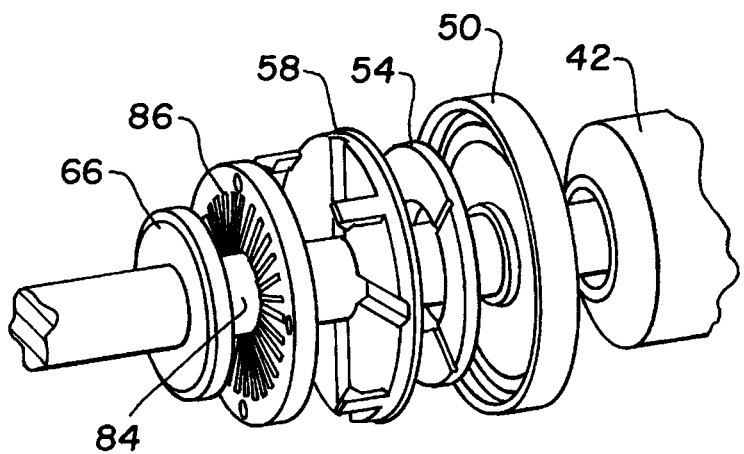
FIG. 6 is a fragmentary exploded view of another variation of the end link shown in FIGS. 1 & 2.
Figure 7:
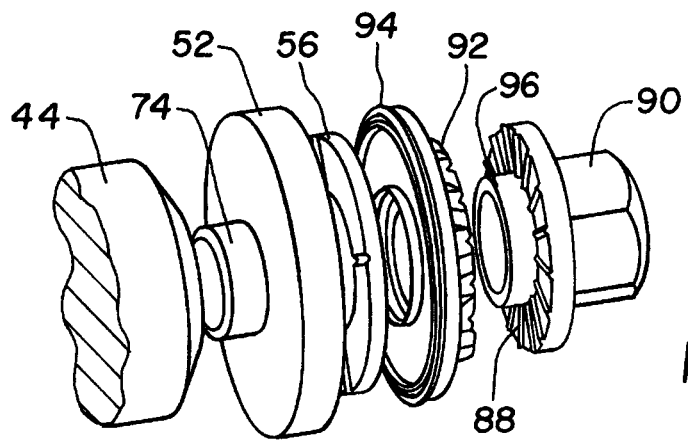
FIG. 7 is a fragmentary exploded view of still another variation of the end link shown in FIGS. 1 & 2.

FIGS. 5, 6 and 7 illustrate additional features that can be included for the fixed washer design illustrated in FIGS. 1 and 2 so as to secure various components against relative rotation. A Keps nut can be used for washer 64 and nut 70; however, contrary to a typical Keps nut assembly in which the washer is held by but rotational with respect to the nut, in a fixed washer design the washer is staked to the nut. Dimples 80 on washer 64 mate with grooves 82 on bearing race 60 to maintain the relative positioning of the washer and the bearing race with respect to one another. Serrations on collar 66 can be provided to mate with grooves 86 in the face of washer 62 to retain the relative positioning of collar 66 and washer 62 with respect to one another. As shown in FIG. 7, serrations 88 can be provided on the face of a nut 90 to mate with grooves 92 on the face of a combination washer/bearing race 94, and a tube-like extension 96 from the nut 90 retains the nut in an assembly by pressing into the ID of the washer/bearing race 94 to provide additional resistance to relative rotation between the nut 90 and washer/bearing race 94. It should be understood that serrations 88 and grooves 92 can be used without tube-like extension 96, and tube-like extension 96 can be used without serrations 88 and grooves 92.

Figure 8:
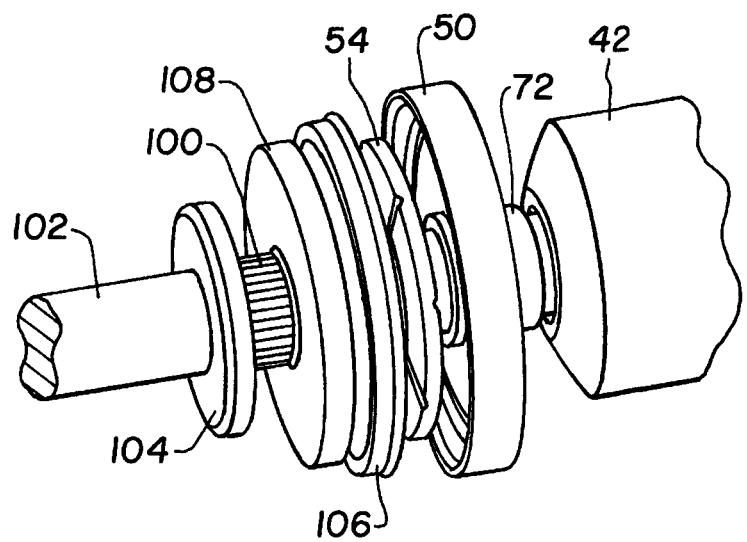
FIG. 8 is a fragmentary exploded view of a variation of the end link shown in FIGS. 3 & 4.
Figure 9:
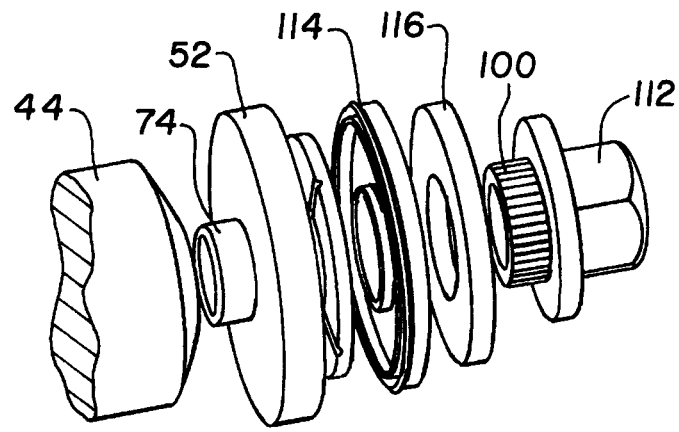
FIG. 9 is a fragmentary exploded view of another variation of an end link.

FIGS. 8 & 9 depict further details that can be used in a floating washer design as shown in FIGS. 3 & 4. Knurls 100 on a rod 102 outwardly of a rod collar 104 can be pressed into a bearing race 106 to form grooves in the bearing race. Knurls 100 pass through a washer 108 without interference. Accordingly, the knurls retain the relative positions of the bearing race, rod and collar independent of washer 108 so that the washer remains free to float. Similar knurls can be used on a flange nut 112 to form grooves when press fit into a bearing race 114, the knurls passing through washer 116 without interference, thereby leaving washer 116 free to float.

Figure 10:
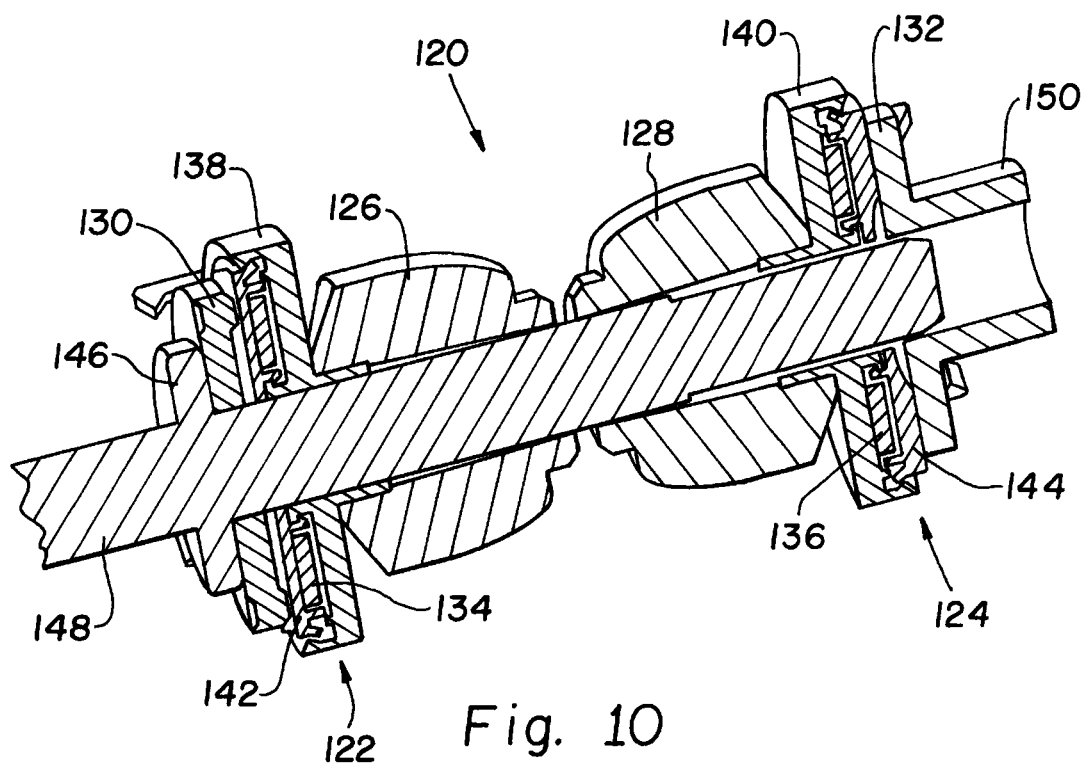
FIG. 10 is a cross-sectional view of a further direct acting end link.

FIG. 10 depicts a further variation for an end link 120 having three-piece bearing assemblies 122, 124 on opposite sides of grommets 126, 128. Steel washers 130, 132 are used adjacent the bearing assemblies, which include center bearings 134, 136; inner races 138, 140 and outer races 142, 144. A collar 146 on rod 148 confronts bearing assembly 122, and a nut and washer assembly 150 confronts bearing assembly 124.

Figure 11:
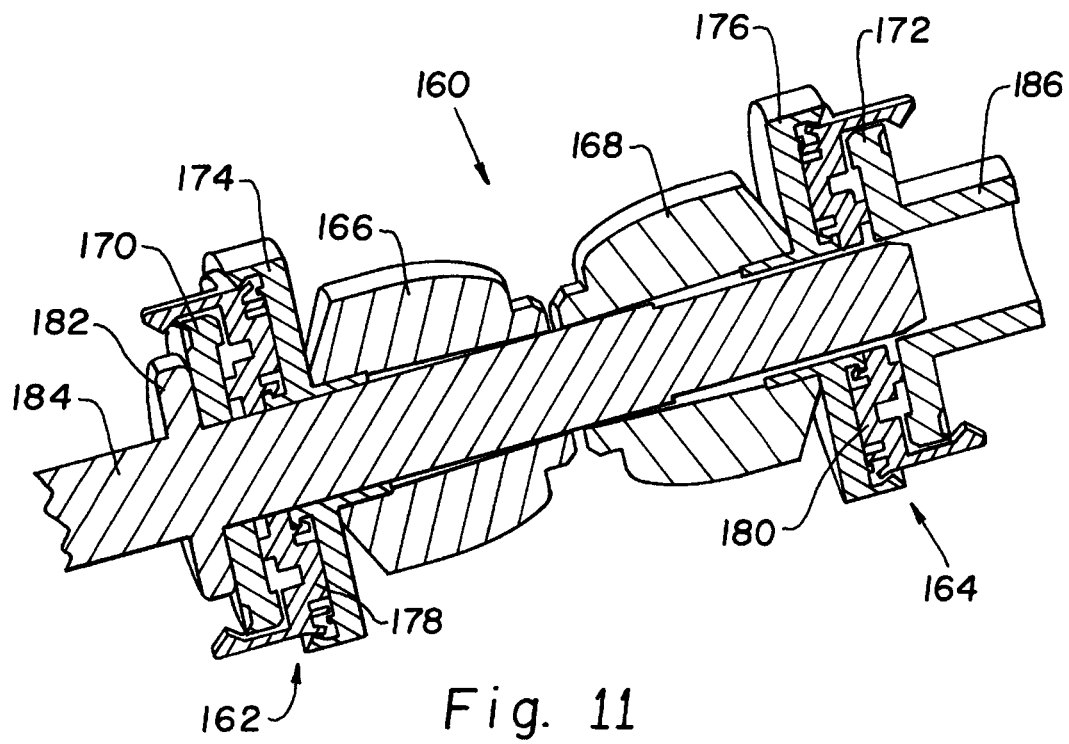
FIG. 11 is a cross-sectional view of yet another direct acting end link.

FIG. 11 depicts a further variation for an end link 160 having two-piece bearing assemblies 162, 164 for reduced components and potential simplification and savings during assembly and installation. Bearing assemblies 162, 164 are provided on opposite sides of grommets 166, 168. Steel washers 170, 172 are used adjacent the bearing assemblies. In this embodiment, the bearing assemblies include inner bearing components 174, 176 and outer bearing components 178, 180 without center bearing components. A collar 182 on rod 184 confronts bearing assembly 162, and a nut and washer assembly 186 confronts bearing assembly 164.

Figure 12:
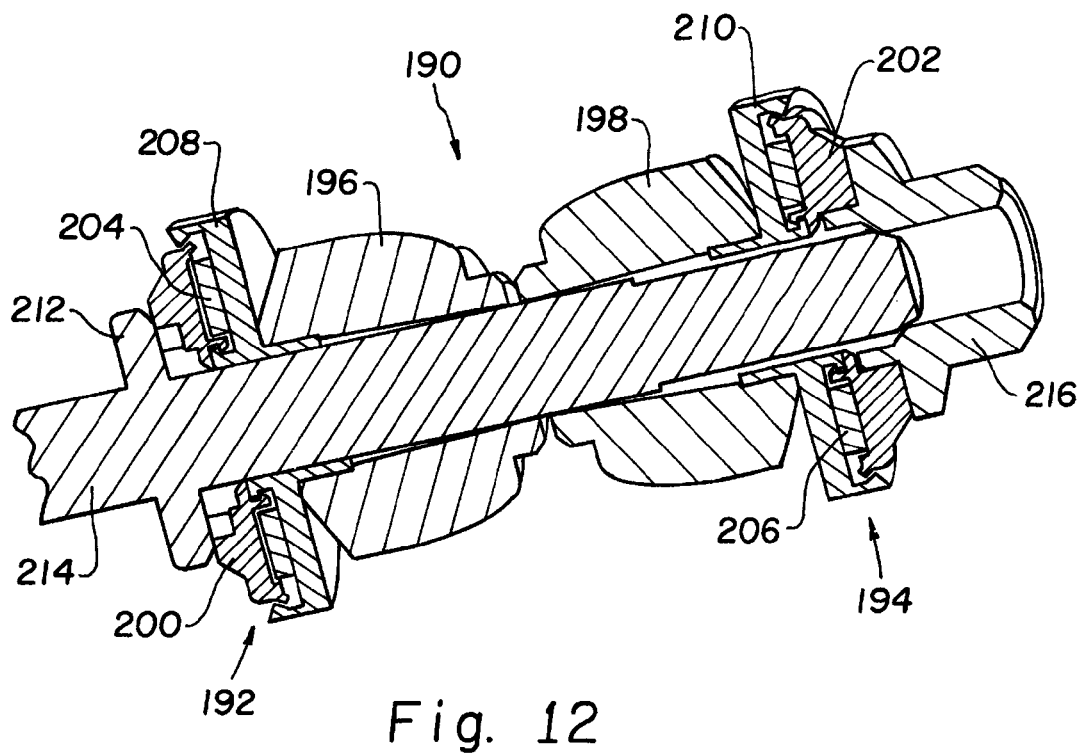
FIG. 12 is a cross-sectional view of a still further direct acting end link.

FIG. 12 depicts a still further variation for a three-piece bearing design having low friction and wear. End link 190 includes bearing assemblies 192, 194 on opposite sides of grommets 196, 198. The steel washers of previously described embodiments and one bearing race in each bearing assembly are structurally combined by using a combination bearing/washer component of plastic. Accordingly, bearing assembly 192 includes combination bearing/washer 200 and bearing assembly 194 includes combination bearing/washer 202. Bearing assemblies 192, 194 further include center bearing components 204, 206, respectively, and inner bearing races 208, 210, respectively. A collar 212 on rod 214 confronts bearing assembly 192, and a nut and washer assembly 216 confronts bearing assembly 194.

Figure 13:
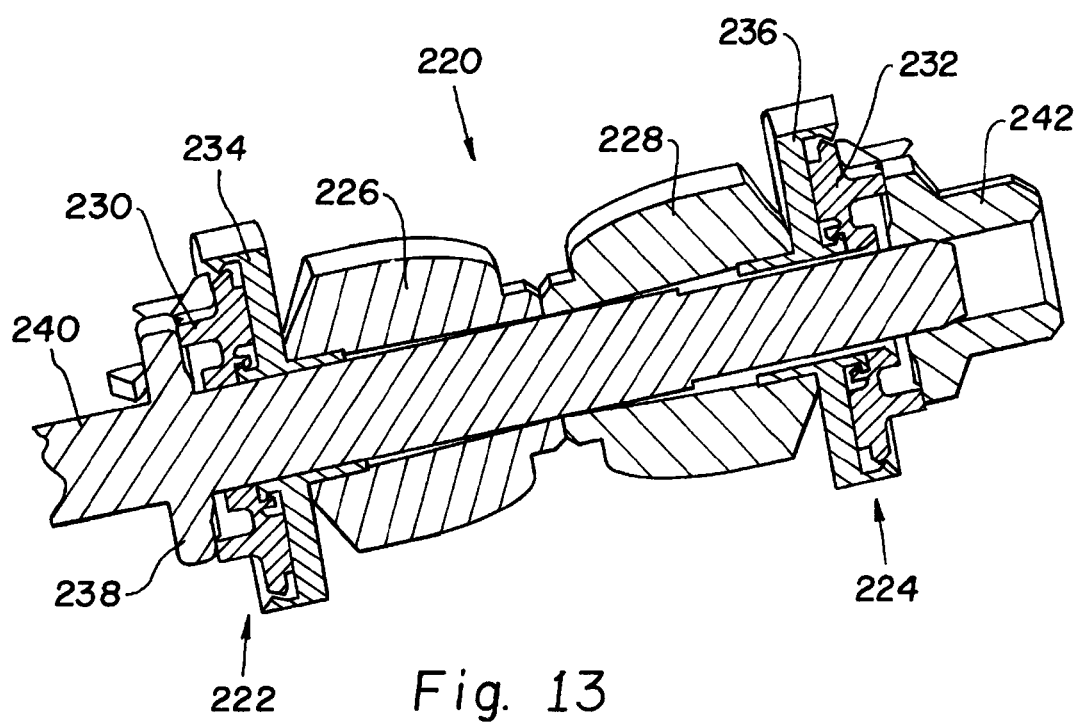
FIG. 13 is a cross-sectional view of still another direct acting end link.

FIG. 13 illustrates yet another embodiment for a two-piece bearing design of reduced components. End link 220 includes bearing assemblies 222, 224 on opposite sides of grommets 226, 228. The steel washers and one bearing race are again combined into plastic bearing/washer components 230, 232 having wear surfaces eliminating the need for separate center bearing components. A second set of one-piece bearing halves/races 234, 236 are provided. It should be understood that wear surfaces also could be provided in races 234, 236 instead of or in addition to the wear surfaces in components 230, 232. A collar 238 on rod 240 confronts bearing assembly 222, and a nut 242 confronts bearing assembly 224.

Figure 14:
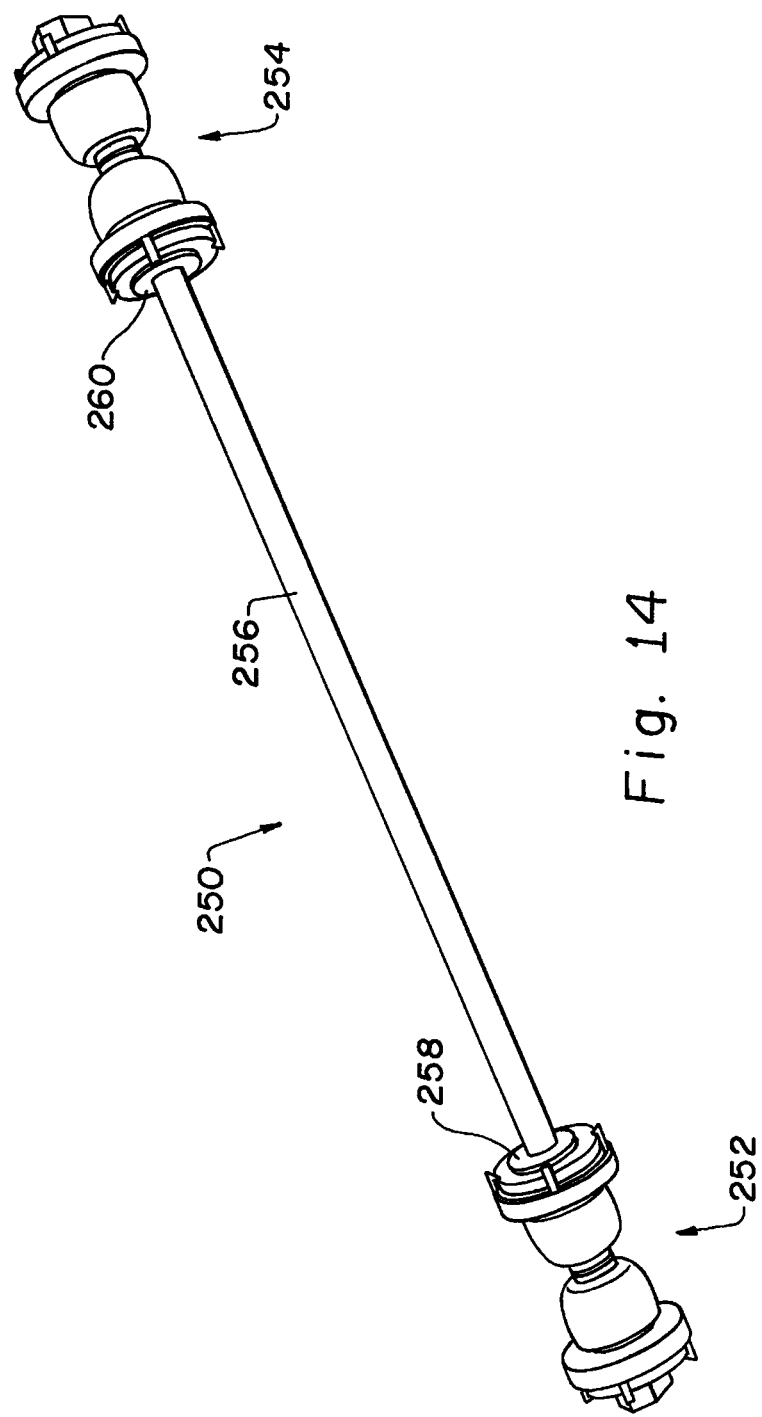
FIG. 14 is a perspective view of still another embodiment of a direct acting end link.

FIG. 14 shows an end link 250 having a connecting structure 252, 254 as described herein on each end of a rod 256, which includes rod collars 258, 260 on opposite ends thereof. One of said connecting structures 252, 254 is suitable for connecting to a strut and the other of said connecting structures 252, 254 is suitable for connecting to a stabilizer bar. Further, however, an end link can include a connecting structure as described herein on only one end of a rod; and another type of connecting configuration at the opposite end of the rod.

Figure 15:
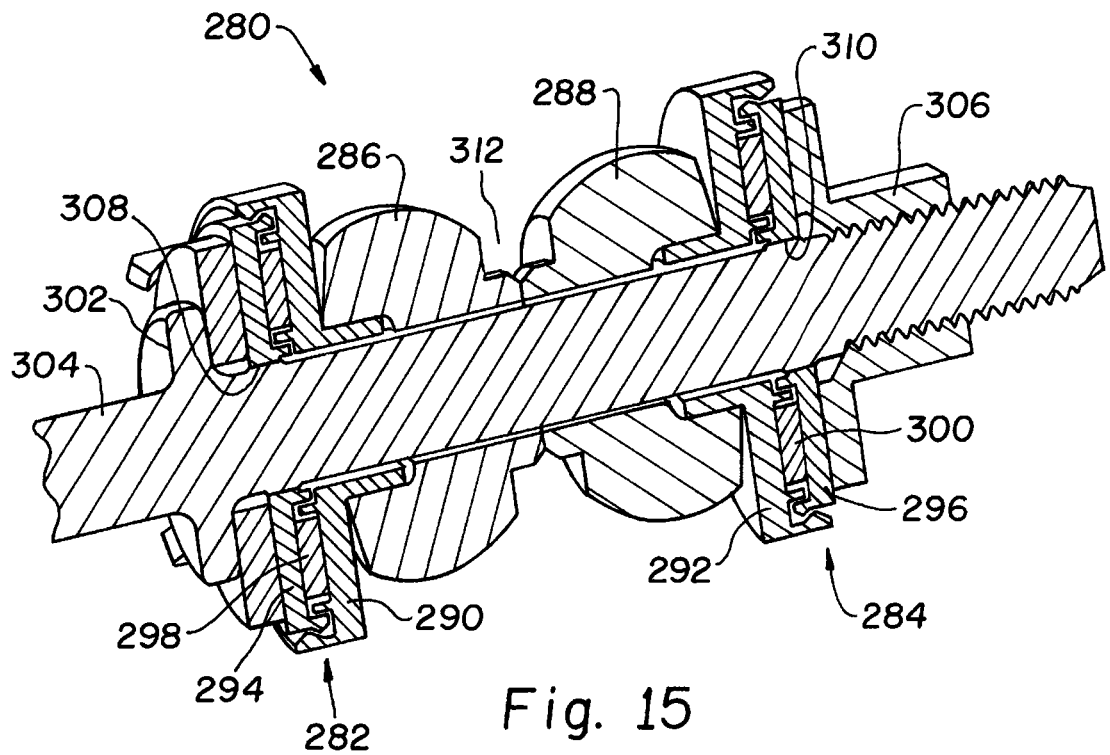
FIG. 15 is a cross-sectional view of another embodiment of a direct acting end link.

FIG. 15 depicts yet another embodiment for an end link grouping various components thereof to move together, separate from other components of the end link. End link 280 includes bearing assemblies 282, 284 on opposite sides of grommets 286, 288. Bearing assemblies 282, 284 each include, respectively, an inner bearing race 290, 292; an outer bearing race 294, 296 and a center bearing component 298, 300 respectively. A collar 302 on rod 304 confronts bearing assembly 282, and a nut 306 confronts bearing assembly 284. Knurled portions 308, 310 are provided on rod 304 to engage outer bearing races 294, 296, respectively, which can be made of plastic or other material softer than knurled portions 308, 310, allowing the knurled portions to embed therein. Accordingly, outer bearing races 294, 296 are grouped together with rod 304 for co-rotation separate from inner bearing races 290, 292 which are grouped together with grommets 286, 288. Center bearing components 298, 300 are independent of the groupings including the inner bearing races and the outer bearing races. A mounting pad receiving space 312 is defined between grommets 286, 288.

Figure 16:
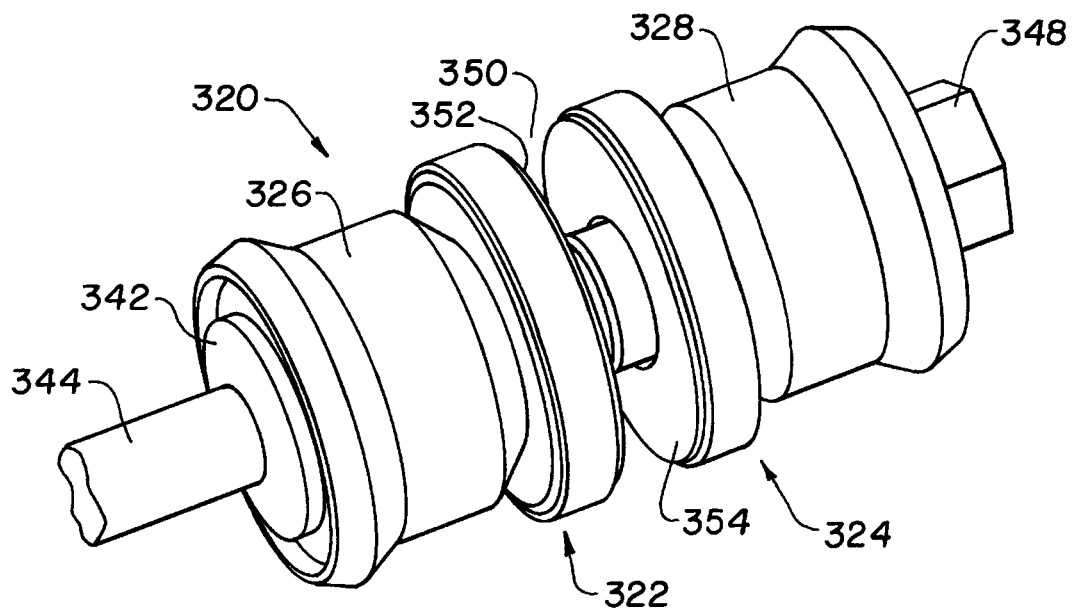
FIG. 16 is a perspective view of still another end link.
Figure 17:
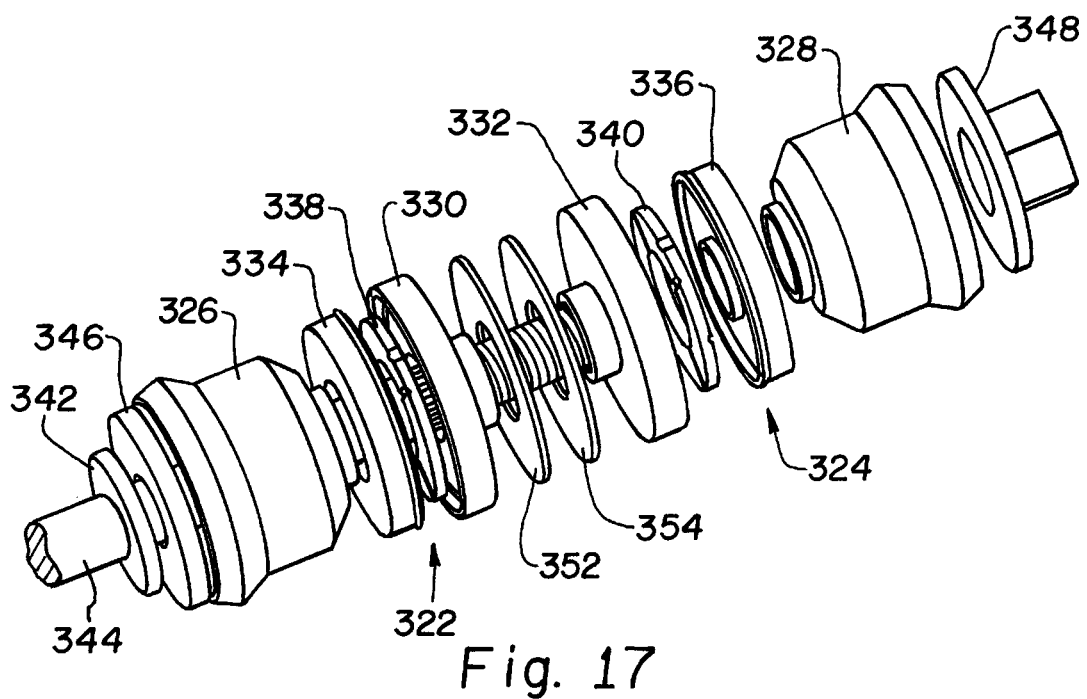
FIG. 17 is an exploded view of the embodiment shown in FIG. 16.

FIGS. 16 and 17 depict yet another alternative arrangement in which bearing assemblies are provided against the mounting pad, between grommets of the assembly. Accordingly, end link 320 includes bearing assemblies 322, 324 confronting one another at the center of the assembly, generally between grommets 326, 328. Each of bearing assemblies 322, 324 includes an inner bearing race 330, 332; an outer bearing race 334, 336 and a center bearing component 338, 340. A collar 342 on rod 344 confronts an end washer 346 against grommet 326. A nut and washer assembly 348 confronts grommet 328. A mounting pad receiving space 350 is defined between bearing assemblies 322, 324. Confronting discs 352, 354 of rubber or other material can be provided inwardly of inner bearing races 330, 332 to engage inner bearing races 330, 332 against the mounting pad for co-rotation. Outer bearing races 334, 336 are engaged with grommets 326, 328 and rod 344 for co-rotation.

Figure 18:
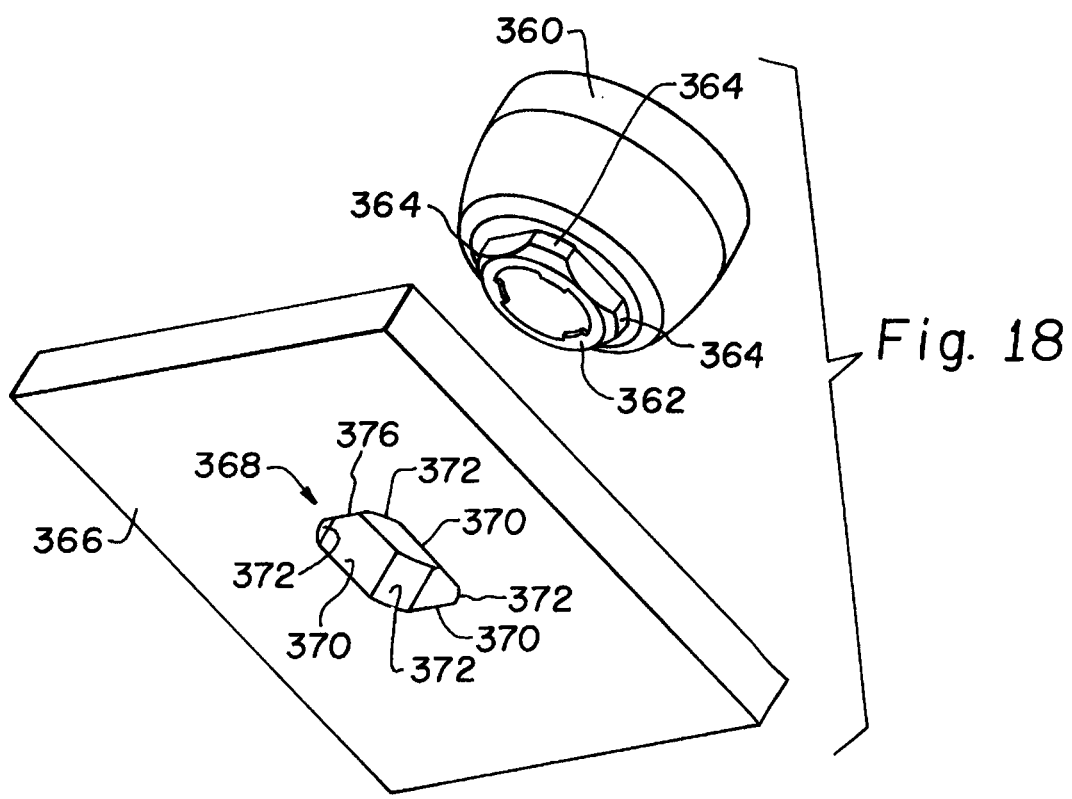
FIG. 18 is a fragmentary, exploded perspective of still another form for a portion of an end link.

The grommets depicted and described previously herein have included grommet collars having generally rounded outer configurations to frictionally engage circular openings in a mounting pad or bearing race (FIG. 17) for example. However, it should be understood that other geometric configurations can be used to promote more positive engagement of any of the grommets with the mounting pad or bearing race with which it is engaged. FIG. 18 illustrates a grommet 360 having a grommet collar 362 including radial projections 364. A mounting pad 366 includes a correspondingly shaped opening 368 having flats 370 and angled corners 372 for engaging grommet collar 362 to provide a more positive physical engagement of grommet collar 362 in opening 368. It should be understood that other complementary geometric configurations also can be used between adjacent parts that are to engage for co-movement. For example, keyed mating also can be provided between the rod and bearing races, which can include mating flat areas along the length of the rod and flat areas in the holes through the bearing races that are to engage the rod.

Various structures can be used as the bearings, bearing surfaces and bearing components in the end links described herein. Some examples include Teflon sintered bearing assemblies, needle roller bearings, Teflon coated washers and strut bearings or thrust bearings; however, it should be understood that these are merely exemplary and not limiting as to the types of structures that can be used.

The end links described herein provide superior durability to better withstand environmental elements. Compared to known connections, the end links described herein provide improved failure modes. Even when wear occurs, the end links will continue to function very well. Unlike a ball joint link which can become excessively noisy, loose and difficult to operate from wear, in the designs described herein initial compression of the grommets allows the grommets to expand as other parts wear, with the grommets thereby taking up the increased space that would otherwise occur from wear. Accordingly little noticeable change in performance is expected even after prolonged use. The various embodiments described herein, as well as others consistent herewith, can control which components thereof rotate relative to one another to more accurately isolate and compensate for noise, vibration, hum, wear and other structural phenomenon from the operation of a link. It is believed that by controlling the interaction of the grommets in the mounting pads of a steerable strut, the "feel" of steering can be altered to provide a desired response. The designs consistent herewith are believed to provide lower cost and improved assembly methods since the hold and drive features or backup wrenches will be simplified or not required compared to existing ball link joint type assemblies. It is further believed that the structures will be more universally usable, and that left hand and right hand specific links may not be necessary.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An end link for connecting a stabilizer to a strut in a direct acting suspension system, the stabilizer having a mounting pad with a hole therein, said end link comprising;
   first and second grommets confronting each other and configured for engaging a strut mounting pad therebetween;
   first and second bearing assemblies adjacent the first and second grommets respectively on opposite sides of said grommets;
   a rod extending through said first and second grommets and said first and second bearing assemblies;
   first and second end structures of said rod confronting opposite sides of said first and second bearing assemblies for compressing said first and second grommets toward one another; and
   each of said first and second bearing assemblies including portions thereof connected to for rotation with said first and second grommets, and further portions thereof independently rotatable relative to said first and second end structures.

2. The end link of claim 1, said grommets including collars of reduced diameter for engaging the hole in the mounting pad.

3. The end link of claim 1, said bearing assemblies each having a reduced diameter collar for engaging opposite sides of said first and second grommets.

4. The end link of claim 3, said grommets including collars of reduced diameter for engaging the hole in the mounting pad.

5. An end link for connecting a stabilizer to a strut in a direct acting suspension system, the stabilizer having a mounting pad with a hole therein, said end link comprising;
   first and second grommets confronting each other and configured for engaging a strut mounting pad therebetween;
   first and second bearing assemblies adjacent the first and second grommets respectively on opposite sides of said grommets;
   a rod extending through said first and second grommets and said first and second bearing assemblies;
   first and second end structures of said rod confronting opposite sides of said first and second bearing assemblies for compressing said first and second grommets toward one another; and
   said first and second grommets being mutually connected for limited rotation relative to each other and more independent rotation relative to said first and second end structures.

6. The end link of claim 1, one of said first and second bearing assemblies having a portion thereof connected to for rotation with one of said end structures and the other of said first and second bearing assemblies having a portion thereof connected to for rotation with the other of said end structures.

7. The end link of claim 5, said first and second bearing assemblies each having portions thereof connected to for rotation with said first and second grommets.

8. The end link of claim 5, said first and second bearing assemblies including portions thereof connected to said first and second grommets and other portions thereof connected to said first and second end structures.

9. The end link of claim 1, said first and second end structures including a rod collar adjacent one of said first and second bearing assemblies and a nut engaging the other of said first and second bearing assemblies.

10. An end link for connecting a stabilizer bar to a steerable strut having a mounting pad, said end link comprising;
    a rod including a fixed collar and a threaded end;
    first and second grommets confronting each other on the rod and configured for sandwiching the mounting pad therebetween;
    a first bearing assembly on said rod between said fixed collar and one of said grommets;
    a second bearing assembly on said rod between said threaded end and the other of said grommets;
    a nut engaged on the threaded end of said rod; and
    said first and second grommets and portions of each of said first and second bearing assemblies being interconnected for co-rotation independent of other portions of said first and second bearing assemblies.

11. The end link of claim 10, said rod, said collar, said nut and other portions of said first and second bearing assemblies being interconnected for co-rotation independent of said first and second grommets.

12. The end link of claim 10, said first bearing assembly including a portion thereof connected to said collar for co-rotation.

13. The end link of claim 10, said second bearing assembly including a portion thereof connected to said nut for joined movement therewith.

14. The end link of claim 13, said first bearing assembly including a portion thereof connected to said collar for co-rotation.

15. The end link of claim 14, said first and second grommets and other portions of each of said first and second bearing assemblies being interconnected for co-rotation independent of said collar and said nut.

16. A strut connecting end on an end link including a rod, said strut connecting end connecting the rod to a mounting pad, said strut connecting end comprising:
    a threaded end on said rod;
    a nut engaging said threaded end;
    a collar on said rod spaced inwardly from said threaded end;
    first and second grommets on said rod between said nut and said collar;
    first and second bearing assemblies on said rod between said nut and said collar;

a mounting pad receiving space defined between one of said first and second grommets and said first and second bearing assemblies; and portions of said first and second bearing assemblies interconnected with said rod for limited relative rotation therebetween, and other portions of said first and second bearing assemblies interconnected with a mounting pad held in said mounting pad receiving space; and one of said grommets disposed between said collar and said first and second bearing assemblies and the other of said grommets disposed between said nut and said first and second bearing assemblies.

17. The strut connecting end of claim 16, including first and second knurled portions on said rod, said first and second knurled portions engaging components of said first and second bearing assemblies.

18. The strut connecting end of claim 16, at least one of said grommets including a shaped grommet collar having projections received in a complementary shaped opening of a mounting pad.

* * * * *